April 29, 1930.  L. A. TREAT  1,756,670
VULVA CLAMP
Filed Aug. 6, 1928
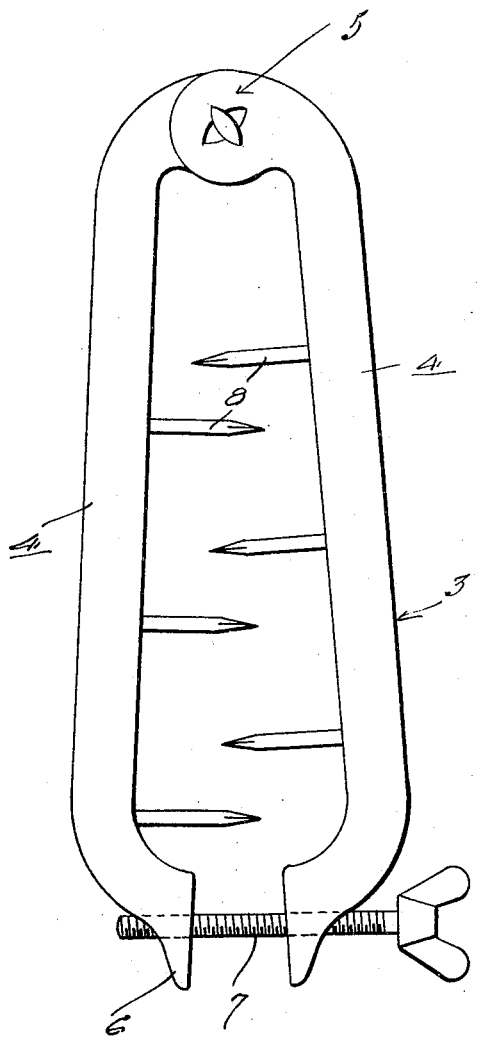
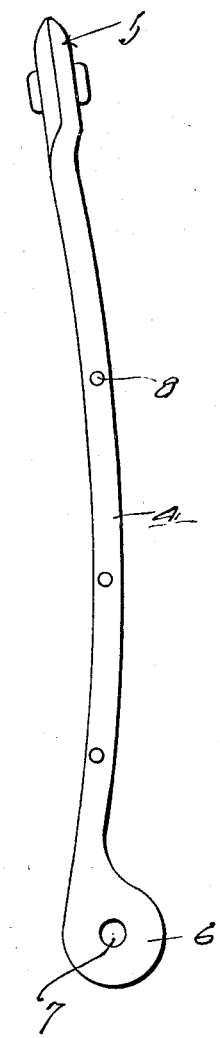
Inventor
L. A. Treat
By Clarence A. O'Brien
Attorney Patented Apr. 29, 1930

1,756,670

UNITED STATES PATENT OFFICE

LESTER A. TREAT, OF BLANDFORD, MASSACHUSETTS

VULVA CLAMP

Application filed August 6, 1928. Serial No. 297,679.

The present invention has reference to a veterinarian's appliance which may be conveniently and aptly entitled a vulva clamp.

The invention has more particular reference to a veterinarian's instrument or appliance of this class especially adapted for use upon domestic animals subjected to prolapsus of the uterus or prolapsus of the vagina, the purpose of the instrument being to overcome and prevent inversion.

The purpose of the invention is to provide an appliance of this class, which is characterized by an arrangement of details which renders it reliable, self-retaining, comfortable, and capable of fulfilling the purposes and requirements of an appliance of this class in an efficient and sanitary manner.

The particular structural features will become more readily apparent from the following description and drawings.

In the drawings:

Figure 1 is an elevational view of a clamp or appliance constructed in accordance with the present invention.

Figure 2 is edge view of the same, showing the shape or curvature adapted for the normal case.

In carrying out the invention, I provide a cast bronze frame or clamp generally designated by the reference character 3, and composed of a pair of substantially duplicate sections 4, whose intermediate portions are substantially straight along the edges but bowed longitudinally between the ends so that they assume the approximate shape shown in Figure 2. At one end these members are directed inwardly toward each other and disposed in overlapping relation where they are separably connected as at 5. The opposite ends are likewise directed inwardly toward each other and terminate in apertured heads 6, one aperture being screw threaded to accommodate the threaded shank of an adjusting and retaining bolt 7. Disposed along the inner edge of the body portions of the sections, and preferably located in longitudinally staggered relation are longitudinally spaced needles 8, preferably steel needles, these lying in a plane with each other for proper penetration. Obviously, the clamp is applied by forcing the needle through the lips of the vulva and tightening the bolt to the desired degree. As before intimated, when thus applied, prolapsus is prevented, and inversion is in turn prevented.

It is positive and dependable and seldom slips or becomes disarranged. Being aseptic it is consequently sanitary, and being constructed of bronze, it is not rustable or breakable under ordinary strain or stress. It is applicable without retaining rope chains or other uncomfortable retaining devices. It is therefore self-retaining.

It is aptly shaped for the purpose specified and therefore is efficient in accomplishing the result for which it is ordained. The advantages in construction of the appliance will doubtless be clear to persons skilled in the art of domestic animals subject to falling or inversion of the uterus or vagina as the case may be.

Consequently a more lengthy description is regarded unnecessary.

I claim:

1. A vulva clamp comprising a pair of complemental members pivotally connected at one end, penetrating needles carried by the respective members and means for securing the member in adjusted position.

2. A vulva clamp comprising a pair of complemental members, each of said members comprising a body portion, bowed longitudinally between the ends and having their intermediate portions substantially straight along the edges, a plurality of penetrating needles carried by each of said members, and means for securing the members in an adjusted position.

3. A vulva clamp comprising a pair of complemental members, each of said members comprising a body portion bowed longitudinally between the ends of the members and being substantially straight along the edges, and each of said members being pivotally connected together at one end and formed at their opposite ends with heads provided with screw threaded openings, and adjustable bolts passing through said openings, each of said members being provided with longitudinally spaced needles, said needles being arranged in longitudinally staggered relation.

In testimony whereof I affix my signature.

LESTER A. TREAT.